United States Patent
Gupta et al.

(10) Patent No.: US 6,718,387 B1
(45) Date of Patent: Apr. 6, 2004

(54) REALLOCATING ADDRESS SPACES OF A PLURALITY OF SERVERS USING A LOAD BALANCING POLICY AND A MULTICAST CHANNEL

(75) Inventors: Amit Gupta, Fremont, CA (US); Raphael Rom, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 08/988,205

(22) Filed: Dec. 10, 1997

(51) Int. Cl.[7] ............................................. G06F 15/173
(52) U.S. Cl. ...................... 709/226; 709/105; 709/225; 370/432; 370/397
(58) Field of Search ................................. 709/256, 215, 709/240, 236, 229, 225, 226, 105; 370/409, 230, 352, 390, 392, 397, 399, 432, 474

(56) References Cited

U.S. PATENT DOCUMENTS

| | | | | |
|---|---|---|---|---|
| 5,187,787 A | * | 2/1993 | Skeen et al. | 709/215 |
| 5,321,693 A | * | 6/1994 | Perlman | 370/403 |
| 5,428,615 A | * | 6/1995 | Backes et al. | 370/392 |
| 5,557,798 A | * | 9/1996 | Skeen et al. | 709/215 |
| 5,774,660 A | * | 6/1998 | Brendel et al. | 709/201 |
| 5,835,723 A | * | 11/1998 | Andrews et al. | 709/226 |
| 5,835,725 A | * | 11/1998 | Chiang et al. | 719/228 |
| 5,881,238 A | * | 3/1999 | Aman et al. | 709/226 |
| 5,892,924 A | * | 4/1999 | Lyon et al. | 709/240 |
| 5,920,705 A | * | 7/1999 | Lyon et al. | 709/240 |
| 5,951,694 A | * | 9/1999 | Choquier et al. | 714/15 |
| 5,974,453 A | * | 10/1999 | Andersen et al. | 709/220 |
| 5,996,021 A | * | 11/1999 | Civanlar et al. | 370/392 |
| 6,006,334 A | * | 12/1999 | Nguyen et al. | 709/227 |
| 6,009,474 A | * | 12/1999 | Lu et al. | 709/245 |
| 6,018,771 A | * | 1/2000 | Hayden | 709/231 |
| 6,041,343 A | * | 3/2000 | Nguyen et al. | 709/203 |
| 6,061,349 A | * | 5/2000 | Coile et al. | 370/389 |
| 6,070,191 A | * | 5/2000 | Narendran et al. | 709/226 |
| 6,085,238 A | * | 7/2000 | Yuasa et al. | 709/223 |

(List continued on next page.)

FOREIGN PATENT DOCUMENTS

| | | |
|---|---|---|
| EP | 0 865 180 A2 | 9/1998 |
| GB | 2 281 793 A | 11/1993 |
| JP | 9-93304 | 4/1997 |
| WO | WO 99/30460 | 6/1999 |

OTHER PUBLICATIONS

Rekhter et al., RFC 2105, Cisco Systems' Tag Switching Architecture Overview, Feb. 1997.*
Damani et al., Sixth International WWW Conference, ONE–IP: Techniques for Hosting a Service on a Cluster of Machines, Apr. 97.*
J. Moy, RFC 1247, OSPF Version 2, Jul. 91.*
Rekhter et al., RFC 2105, Cisco Systems' Tag Switching Architecture Overview, Feb. 97.*
Dias, Daniel M. et al., "A Scalable and Highly Available Web Server", Digest of Papers Compcon (Computer Society Conference) 1996 IEEE, pp. 85–92, XP 000628467.

*Primary Examiner*—David Wiley
*Assistant Examiner*—William C. Vaughn, Jr.
(74) *Attorney, Agent, or Firm*—Rosenthal & Osha L.L.P.

(57) ABSTRACT

A method for load balancing including creating a network, having a plurality of servers, to service a single multicast address using a source specific join, where the source specific join allows each of the plurality of servers to specify a source internet protocol address range that each of the plurality of servers services. Further, method includes reallocating the source internet protocol address range specified for at least one of the plurality of servers using a load balancing policy and a control multicast channel while at least one of the plurality of servers is handling communications.

14 Claims, 21 Drawing Sheets

U.S. PATENT DOCUMENTS

| | | | |
|---|---|---|---|
| 6,128,279 A | * 10/2000 | O'Neil et al. | 370/229 |
| 6,128,657 A | * 10/2000 | Okanoya et al. | 709/224 |
| 6,188,671 B1 | * 2/2001 | Chase et al. | 3710/232 |
| 6,249,820 B1 | * 6/2001 | Dobbins et al. | 709/238 |
| 6,272,523 B1 | * 8/2001 | Factor | 709/201 |
| 6,279,032 B1 | * 8/2001 | Short et al. | 709/209 |
| 6,298,063 B1 | * 10/2001 | Coile et al. | 370/242 |
| 6,330,602 B1 | * 12/2001 | Law et al. | 709/224 |
| 6,334,114 B1 | * 12/2001 | Jacobs et al. | 705/26 |
| 6,351,775 B1 | * 2/2002 | Yu | 709/238 |
| 6,449,647 B1 | * 9/2002 | Colby et al. | 709/226 |
| 6,470,389 B1 | * 10/2002 | Chung et al. | 709/227 |

* cited by examiner

| Network Address | Alias | Owner | Public Key | Optional Public/Private Flag |
|---|---|---|---|---|
| 221.0.96.3 | MULTICAST.host.sponsor.com | abc123@host.sponsor.com | AXJY931ZFDE271...KJ | 1 |
| ... | ... | ... | ... | ... |
| ... | ... | ... | ... | ... |

400 — Network Address
410 — Alias
420 — Owner
430 — Public Key
440 — Optional Public/Private Flag

*FIG. 4*

| Header | Field 1 | Field 2 | Field 3 | Field 4 | |
|---|---|---|---|---|---|
| | IGMP Join Request and Timestamp | Requestor IP Address | Random Key | Fields 1-3 Encrypted | CRC |

500 — Header
510 — CRC

*FIG. 5*

REALLOCATING ADDRESS SPACES OF A PLURALITY OF SERVERS USING A LOAD BALANCING POLICY AND A MULTICAST CHANNEL

CROSS REFERENCE TO RELATED APPLICATIONS

This invention is related to U.S. application Ser. No. 08/885,817, filed Jun. 30, 1997 by inventors Amit Gupta and Paul Jardetzky entitled "Techniques for Securing Data Flow in Internet Multicasting" P2270/TJC) which is incorporated by reference herein in its entirety.

BACKGROUND OF THE INVENTION

1. Field of the Invention

The invention relates to computer networks and, more particularly, to the provision of highly-distributed servers for network applications, such as web service on the Internet.

2. Description of Related Art

Exponential growth in the number of clients and servers connected to large scale networks, such as the Internet, is causing increased problems of scale. At the same time that demand is accelerating, the network infrastructure is growing at a relatively slow rate. As these networks become more commercialized, the information and services provided by network servers represent a major revenue stream for many companies. The dependence of such companies on network services has led to increased demand for very high volume network servers and, particularly where companies have a global presence, there is a demand for distributed, uniform interface network servers that provide for graceful degradation in the face of problems in parts of the network. Components, such as host computers, packet switches, packet routers, gateways and the like, which are frequently used in construction of networks are well known in the art.

Many researchers have explored different mechanisms to improve the performance of network servers and systems. Some popular techniques include caching, and load balancing through the use of multiple servers. Some sites identify different servers with different names, each serving different geographic regions. Some approaches attempt to distribute access to a plurality of servers by using the domain name system (DNS) to randomize the server assigned when a connection request is directed to a particular company server. Some approaches attempt to utilize or mis-utilize the DNS by modifying the functionality of the DNS to poll each of the servers associated with a well known address to find out how loaded they are. The DNS then resolves the domain name to the IP address of the least loaded server.

The Problems

As demand for large network services has increased disproportionately with the underlying infrastructure to support the demand, the usefulness of such networks has been hampered by the congestion and bottlenecks which result. Currently, it is not uncommon for users to wait for tens of seconds and sometimes even minutes before they can get any information from the more popular (high-traffic) web servers. These delays frustrate the users and make them less likely to use a network for obtaining desired resources and services. This wasted time and effort represents a loss of productivity for network users and the resulting revenue losses are particularly undesirable for commercial Internet sites.

Typically, it would be desirable that a solution to the server problem have the following properties:

1. The provider should be able to set up many different web servers at locations all over a network such as the Internet, without any restrictions (such as requiring all web servers to be on the same subnet).
2. The clients (e.g. network users and their browsers) should be able to send requests to a single, well-advertised IP address.
3. Network servers should be able to, in coordination, choose/dictate the clients that they are willing to serve. They should not be required to listen to all the traffic from all clients. This assignment/selection may change with time and such changes should not impose excessive additional burdens on the routing system.
4. There should not be a single point of failure. Rather, within a reasonable recovery time period, all requests should be directed to any remaining server(s), although requests might experience longer service times (graceful service degradation).

SUMMARY OF THE INVENTION

In accordance with the invention, multiple distributed servers can be provided which accomplish load balancing and graceful degradation in the event of multiple network failures. The load is distributed in accordance with a load balancing policy which may range from the very simple to the very sophisticated.

Three basic approaches may be used individually or in combination. The first involves an extension of multicasting which can be characterized as "manycasting." With manycasting, one can create highly distributed clusters that provide network services with all of the desirable properties described above. In manycasting, source specific "joins" and "leaves" may be utilized to establish the portion of the address space to be serviced by a particular server. Manycasting can be implemented in a secure form to prevent interlopers from intercepting or interfering with the communications. Using the first approach, four different techniques are utilized for reallocating connections when load redistribution occurs. They are (1) connection reset, (2) state synchronization and update, (3) message forwarding and (4) tag switching.

A second approach to overcoming the problems of the prior art involves an extension to the TCP protocol to enable dynamic TCP designations. This approach utilizes an extension to the SYN packet used in a TCP. With this option, the sender provides a tag and a cookie which the receiver can use. If the server is similarly equipped, it replies with a message that includes a tag, a cookie and destination information. When a server gets overloaded, it forwards all new connection requests to a less loaded server in accordance with the distribution policy. However, the same approach can be utilized to redirect a connection from an existing server to a different server. A security mechanism can be utilized to prevent the connection from being hijacked when a "change destination" message is sent.

The third major approach to solving the problems of the prior art utilizes tag switching. A pool of servers is supported behind at least one virtual IP address; virtual IP routers direct the packets for the virtual IP addresses to the server pool. The servers set up a family of tag switch trees (one for each real server). When a virtual IP router receives a tag-less packet, it forwards the packet to the actual IP address of a selected server and informs one or more upstream routers about the actual IP address to which subsequent packets should be directed. The upstream routers then mark all packets for that connection with a tag ID for the designated server. Thus, all subsequent packets will be correctly forwarded via tag switching.

The advantages of the present invention will become readily apparent to those skilled in the art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIG. 4 is a database schema of a DNS server modified in accordance with one aspect of the invention.

FIG. 5 is a diagram of extension to an Internet Group Management Protocol (IGMP) join request in accordance with one aspect of the invention.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. These apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Figure 1:
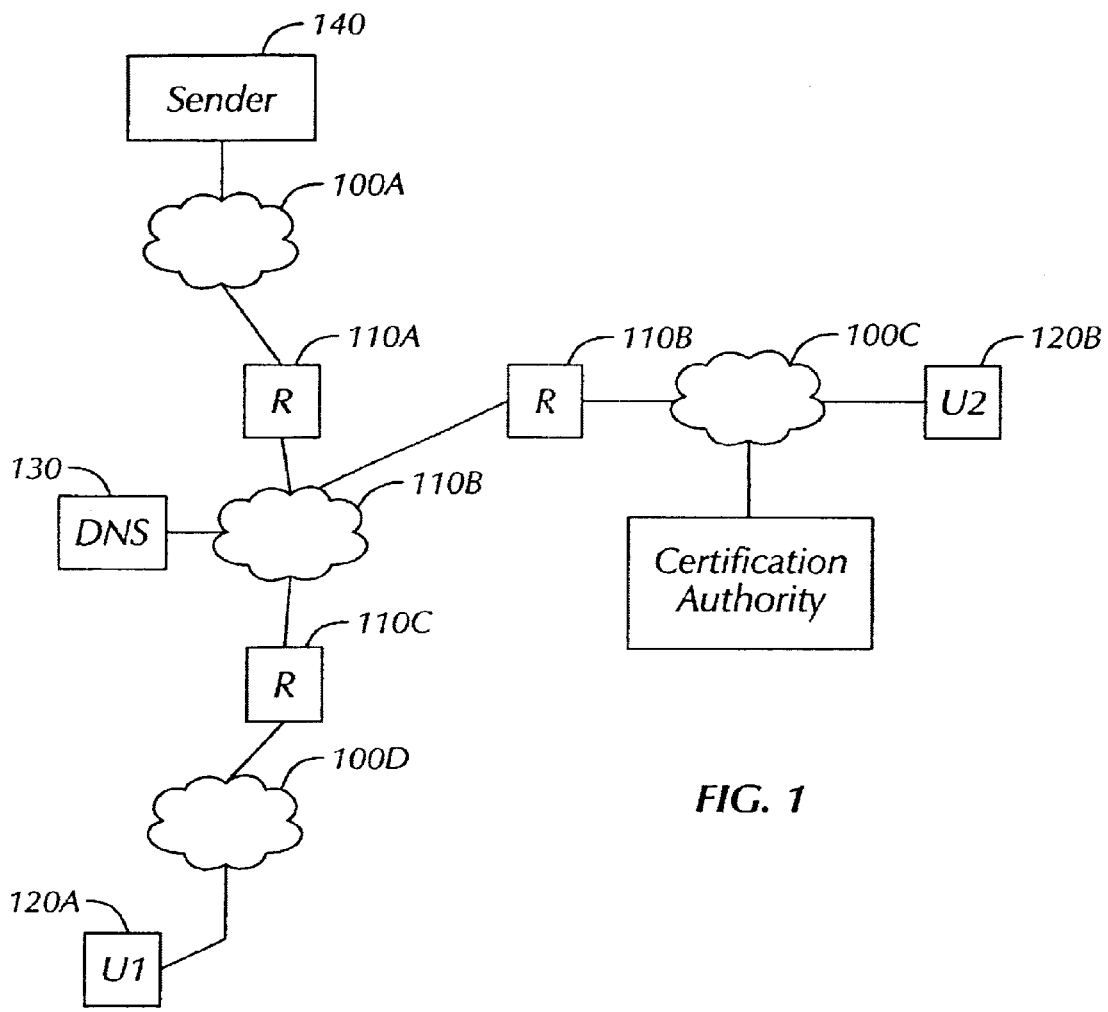
FIG. 1 is a block diagram of an exemplary network arrangement linking a plurality of sub-networks in accordance with one aspect of the invention.

FIG. 1 is a block diagram of an exemplary network arrangement linking a plurality of sub-networks in accordance with one aspect of the invention. As shown in FIG. 1, a plurality of sub-networks 100A, 100B, 100C and 100D are connected together via routers 110A, 110B and 110C. In the network illustrated, DNS server 130 is resident on sub-network 100B and a certification server or authority 150 as resident on sub-network 100C. One or more senders 140 may be the intended source of information for the multicast to exemplary user stations 120A and 120B.

Figures 2, 3:
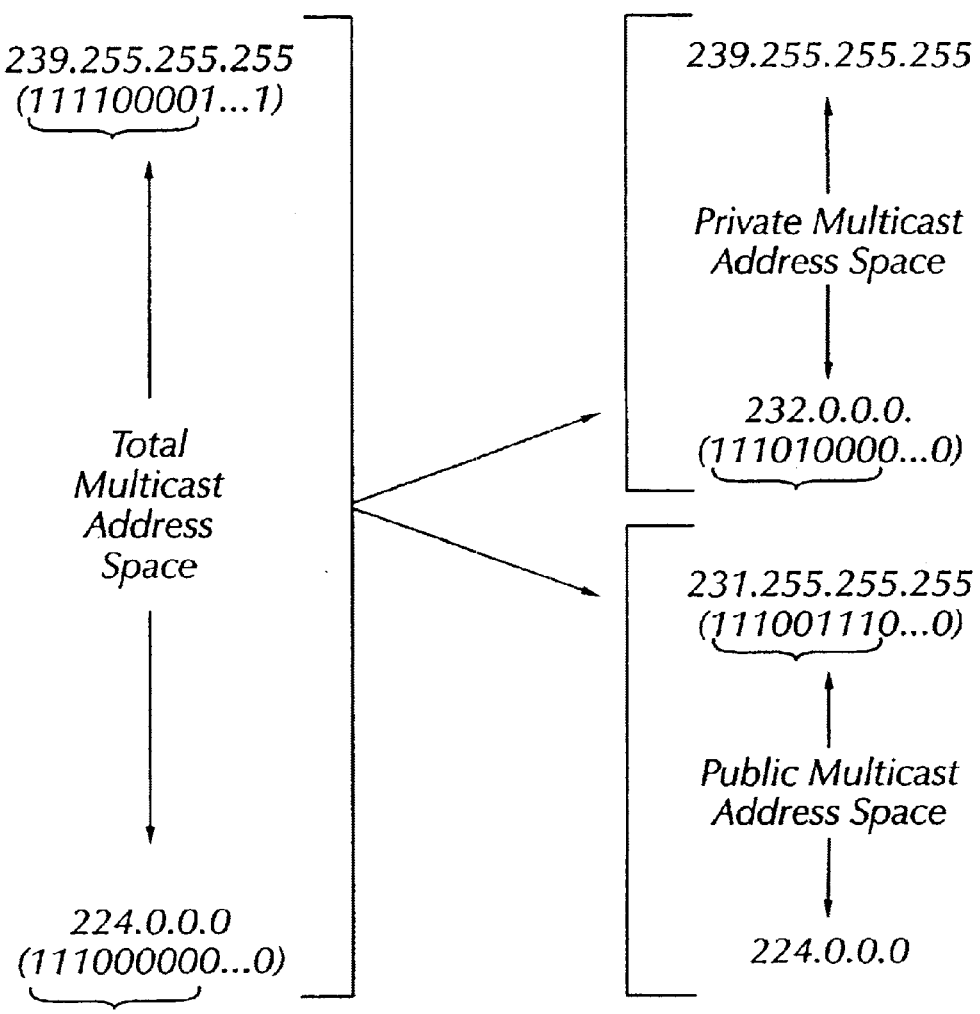
FIG. 2 is an illustration of how a multicast address space may be partitioned into a private multicast address sub-space and public multicast address sub-space.
FIG. 3 is a database schema showing a typical domain named server (DNS) record in accordance with the prior art.

FIG. 2 is an illustration of how a multicast address space may be partitioned into a private multicast address sub-space and public multicast address sub-space.

The left hand side of FIG. 2 represents the total multicast address space. That space ranges from 224.0.0.0 (in Internet standard dotted decimal notation) to 239.255.255.255. Underneath the dotted decimal representation is a parenthetical showing eight binary bits (bracketed) which corresponds to the numerical value of the first component of the dotted decimal notation). Each of the other components of the dotted decimal notation represent the value of a corresponding byte in a 32-bit (4 byte) address space utilized by the Internet. The notation of a binary value 1 or 0 separated by dots from another representation of the same binary value represents an indication that the remaining bits of the 32-bit address word have only those binary values contained therein. One of the important extensions to the multicast address space provided in accordance with the invention is a separation of the multicast address space into two components, the first of which is a public multicast address space and the second of which is a private multicast address space. As shown in FIG. 2, the public multicast address space ranges from 224.0.0.0 to 231.255.255.255. Similarly the private multicast address space ranges from 232.0.0.0 to 239.255.255.255. By this partitioning of the address space, one can tell immediately from a multicast address whether a private multicast is undertaken or a public multicast is undertaken.

FIG. 3 is a database schema showing a typical domain named server (DNS) record in accordance with the prior art. As shown in FIG. 3, a dotted decimal address 300 is mapped against an alias for that address 310 in respective columns of the database table.

FIG. 4 is a database schema of a DNS server modified in accordance with one aspect of the invention. Columns 400 and 410 correspond to approximately to the columns in which entries 300 and 310 of FIG. 3 occur. However, in column 410, instead of a unicast address, an IP multicast address is included. Column 420 contains entries which describe the owner of the multicast address. Typically this would be the person setting up the multicast. Column 430 contains a public key for each private multicast address. Column 440 contains an optional public or private flag which can be used to distinguish public and private multicasts.

When using a DNS server of the prior art, a query using either the network address or it alias will result in return of the other value shown in FIG. 3. When a DNS server is extended in accordance with the arrangement shown in FIG. 4, it is convenient that a query submitted with data from either column 400 or column 410 will result in return of the entire record matching the submitted value. Thus, if one were to search on the alias shown in column 410 of FIG. 4, one would retrieve not only the network address shown in column 400, the owner information shown in 420 but also the public key shown in column 430 for the multicast session. This ability to retrieve public keys is useful as described more in after.

FIG. 5 is a diagram of extension to an Internet Group Management Protocol (IGMP) join request in accordance with one aspect of the invention. A header 500, and packet type shown in Field 1 together with a requester IP address shown in Field 2 would typically be part of prior art IGMP join request. In the extensions shown in accordance with one aspect of the invention, an optional timestamp may be placed in Field 1 and a random key, placed in Field 3, is generated by the requester. The contents of Field 1, Field 2 and Field 3 are encrypted or digested and the digest encrypted and placed into Field 4. The Cyclic Redundancy Check 510 (CRC) encompasses the full IGMP join request. How this extended join request is utilized is discussed more hereinafter.

Figure 6:
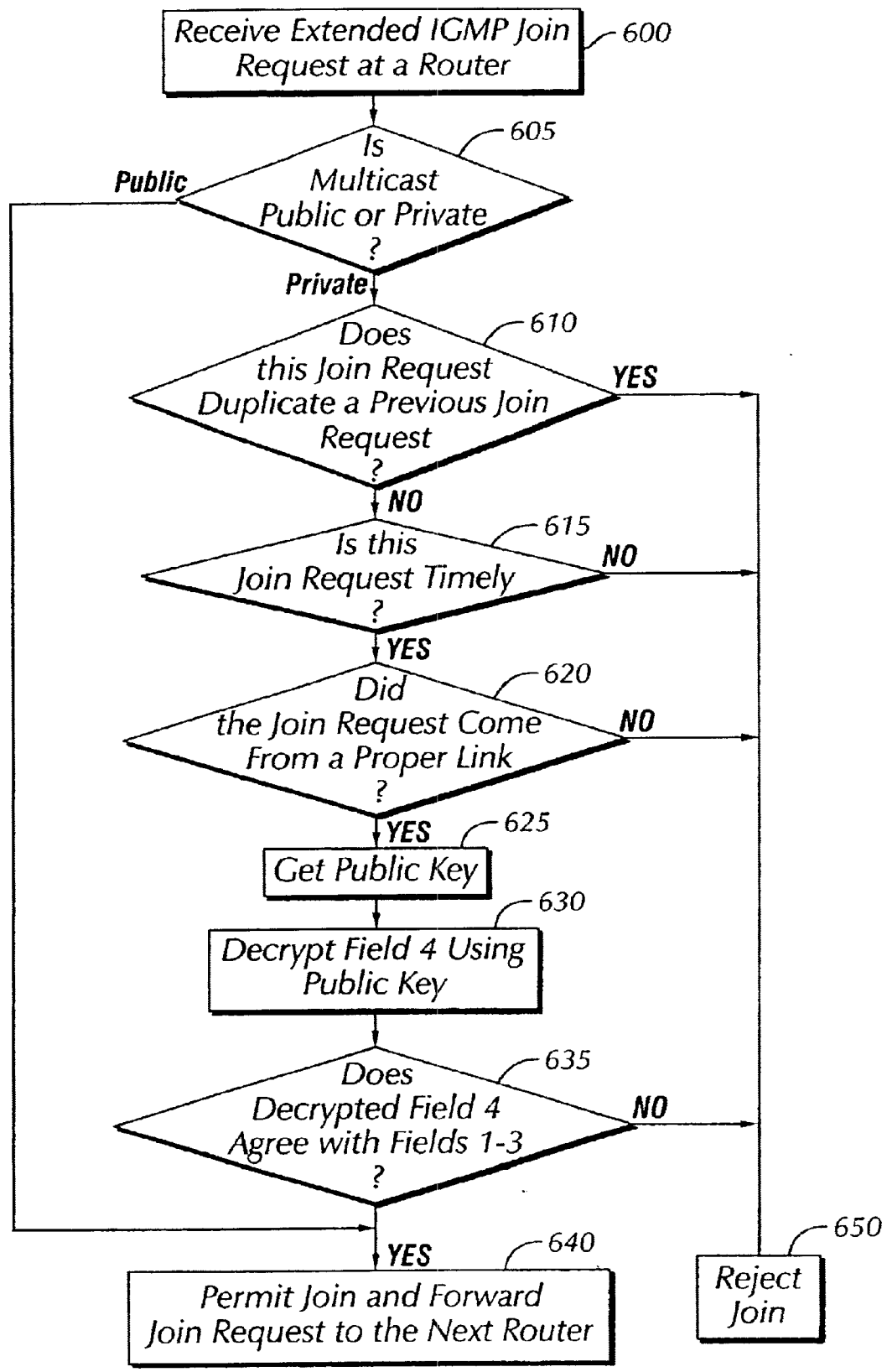
FIG. 6 is a flow chart of an exemplary routing element process for determining whether to permit or reject an IGMP join request in accordance with one aspect of the invention.

FIG. 6 is a flow chart of an exemplary routing element process for determining whether to permit or reject an IGMP join request in accordance with one aspect of the invention. When an extended IGMP join request is received at a router (600) determination is made from the address whether or not the multicast is public or private (605). If it is public (605-public), the join is permitted and the join request forwarded to the next routing element along the path, if any (640). If the multicast is private (605-private) a check is made to determine whether the join request submitted is a duplicate of a previous request. One way an unauthorized user may attempt to gain access to a multicast would be to duplicate a join request submitted by a previous user. If the submitted join request is a duplicate (610-y), the request is rejected. If it is not, a determination is made whether the join request is timely (615). This a simple check to see that the join request is appropriate for the day and time of the current multicast session. This would prevent a user from copying an earlier join request from an authorized user in an attempt to gain access to the current session. If the join request is not timely (615-N), the request to join is rejected. If it is timely, a check is made to determine whether the join request came from a proper link. If it did not (620-N), the join request is rejected. However, if it did, the routing element will obtain the public key dual corresponding to the private key utilized to encrypt the IGMP extended join request (625). Preferably, the public key is obtained from a DNS server, such as DNS 130 shown in FIG. 1. Alternatively, the public key; could be obtained from a certification authority 150 shown in FIG. 1. Using the acquired public key, Field 4 of the extended IGMP join request is decrypted using the public key (630). The resulting information decrypted from Field 4 should agree with Fields 1–3. If it does, the join is permitted and the join request is forwarded to the next routing element. If it does not (635-n), the join request is rejected and the user will be denied access to the multicast by the router.

Figure 7A:
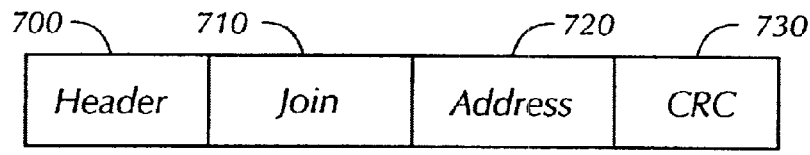
FIG. 7A shows a prior art IGMP join request.
Figure 7B:
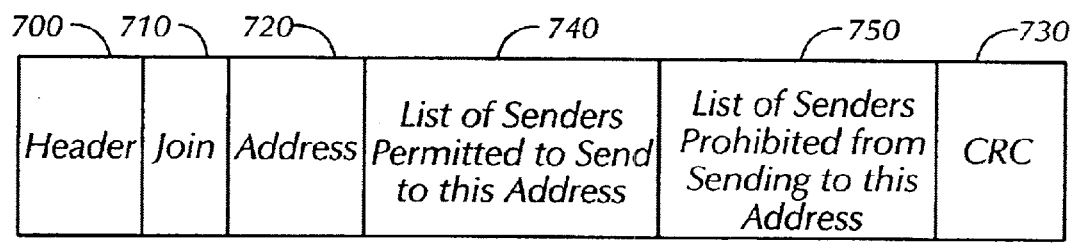
FIG. 7B shows a prior art extension to the IGMP join request of FIG. 7A.
Figure 7C:
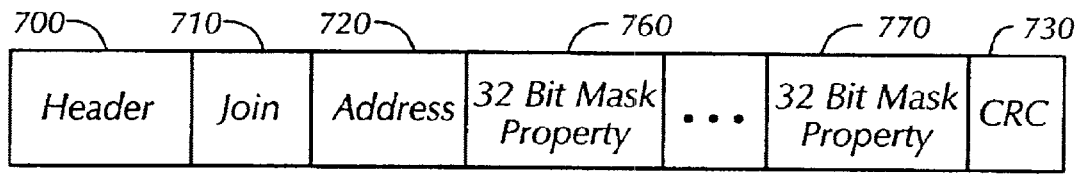
FIG. 7C shows an extension to prior art IGMP join requests in accordance with one aspect of the invention.

A third aspect of the invention is illustrated in FIG. 7A, FIG. 7B and FIG. 7C. FIG. 7A shows a prior art IGMP join request. A header 700 and a CRC field for an envelope containing a join request 710 and address 720.

FIG. 7B shows a prior art extension to the IGMP join request of FIG. 7A. The extension of the IGMP join request of FIG. 7B permits a lists of senders to be specified which are permitted to send to the address requesting the join. Similarly, it includes an list of senders prohibited from sending to the address requesting the join. This permits a participant in the multicast to inform routers to selectively prohibit packets from undesirable or disruptive sources from reaching the participant. It also permits the user to specify the list of senders from which the requesting station desires to receive information. This allows the filtering out of packets that the user does not desire to see.

FIG. 7C shows an extension to prior art IGMP join requests in accordance with one aspect of the invention. Field 760 and Field 770 permit the use of a list of 32-bit masks instead of a list of senders or receivers. Thus, by tailoring a mask, groups of addresses may be permitted to send to the address or barred from sending to the address, merely by specifying the bit-mask appropriate for the group and the property desired. For example, the property may be "permitted to send to this address" or "prohibited from sending to this address".

Figure 8:
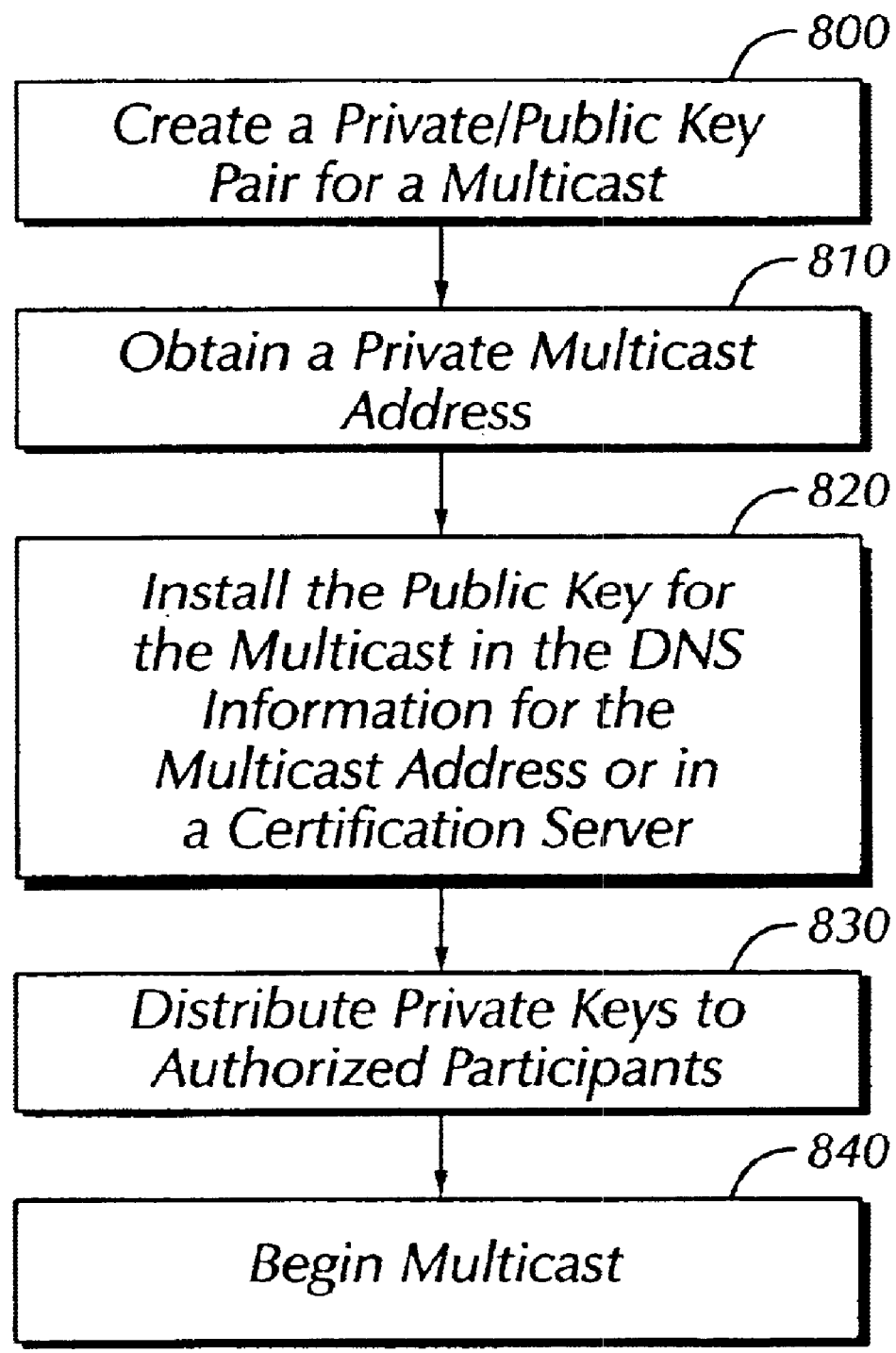
FIG. 8 is a flow chart of a process for setting up a private multicast in accordance with one aspect of the invention.

FIG. 8 is a flow chart of a process for setting up a private multicast in accordance with one aspect of the invention. A user desiring to set up a private multicast first creates a private/public key pair for the multicast (800). The sponsor or owner of the multicast obtains a private multicast address (810) for use during the multicast. This can either be a permanent assignment or a temporary assignment depending on need. The owner of the multicast or other designated party may install the public key for the multicast in the DNS information for the multicast address or in a certification server (820). The private key for the multicast is distributed to authorized participants in any of several known ways, but preferably over the network (810). At that time, the multicast is ready to begin (840). The receivers that desire to participate in the multicast then formulate an extended join request such as described in FIG. 5. If the user is authorized, the routing element will make that determination using the public key installed on the domain named server or on the certification server. When the routing element is satisfied that the request for joining the private multicast is genuine, the routing element will begin directing packets addressed to the multicast address to the user who submitted in the extended IGMP join request. However, if the user is not authorized (as discussed in conjunction with FIG. 6), the user will not be permitted to join the multicast and the routing element will not forward packets to the user.

Figure 9:
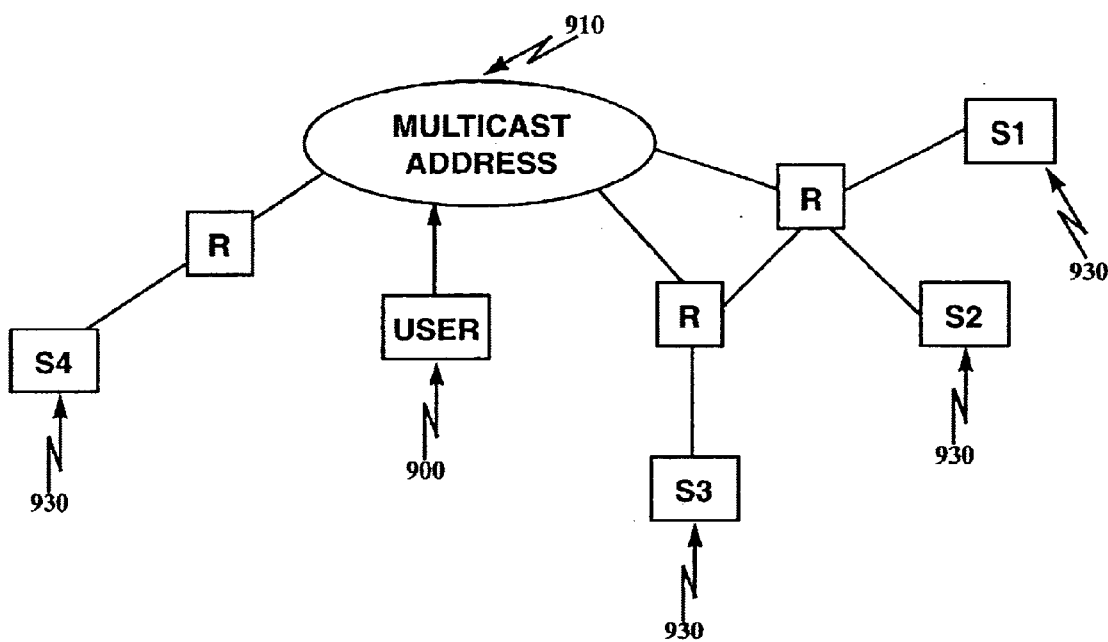
FIG. 9 is a block diagram showing an exemplary first embodiment providing load sharing among servers.

FIG. 9 is a block diagram showing an exemplary first embodiment providing load sharing among servers. In this case, a multicast address 910 is used as a well published address for the network site. When a user 900 attempts to connect to the site, the canonical server name is mapped to a multicast address in the DNS. Each of the servers Si through S4 in this example 930 listens to the multicast. However, when they join the multicast, they use a source specific join and assert a bit map mask which permits them to receive packets from certain senders that are within their portion of the IP address space. That is, connections are allocated to the servers 930 based on the source address as of the senders. Thus, a particular user 900 when sending to the multicast address will be routed by routers 920 to only one of the servers 930.

Figure 10:
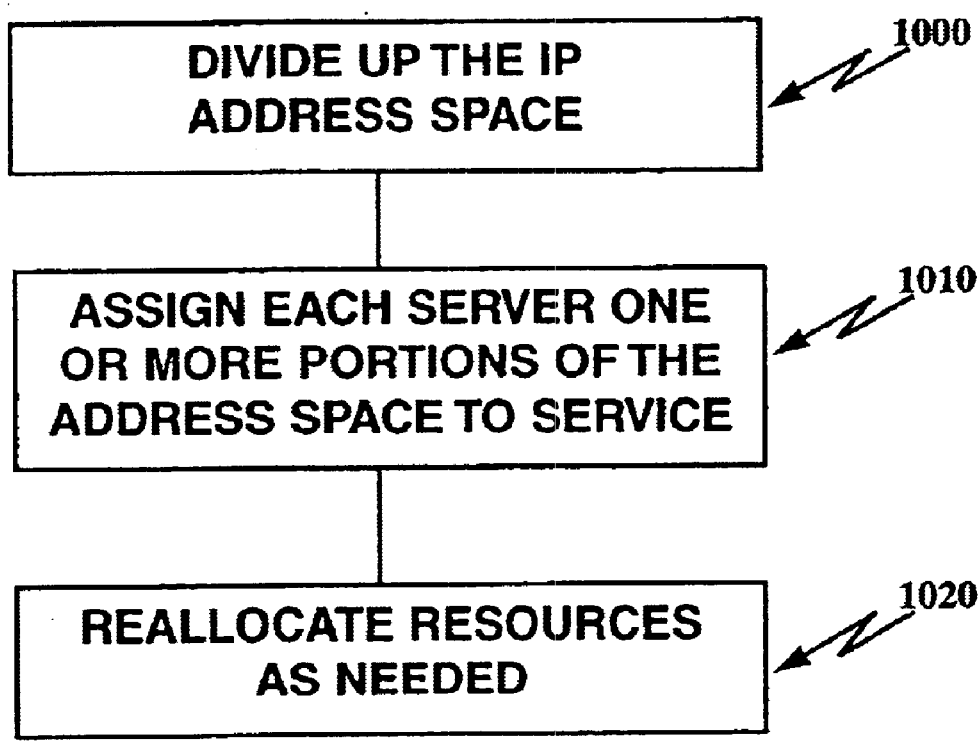
FIG. 10 is a flow chart of a process for load sharing among servers in accordance with one aspect of the invention.

FIG. 10 is a flow chart of a process for load sharing among servers in accordance with one aspect of the invention. The IP address space to be serviced by the servers is divided up into a number of portions (1000). Each server is assigned one or more portions of the address space to service (1010). That is, if there were three servers, one might wish to divide up the address space so that each server serviced approximately one-third of the address space. In the event that certain portions of the address space were more active than others, one might wish to divide up the address space into thirty portions and assign every third portion to one of the servers so that each got a share of the more active parts of the address space. The way in which the load is balanced or the address space shared is a matter of an allocation policy which is implemented as discussed herein. After an initial assignment of address space, it may be necessary to reallocate resources on an as needed basis (1020). This might occur, for example, when a server became inoperative, or, when one server became unduly congested.

Figure 11:
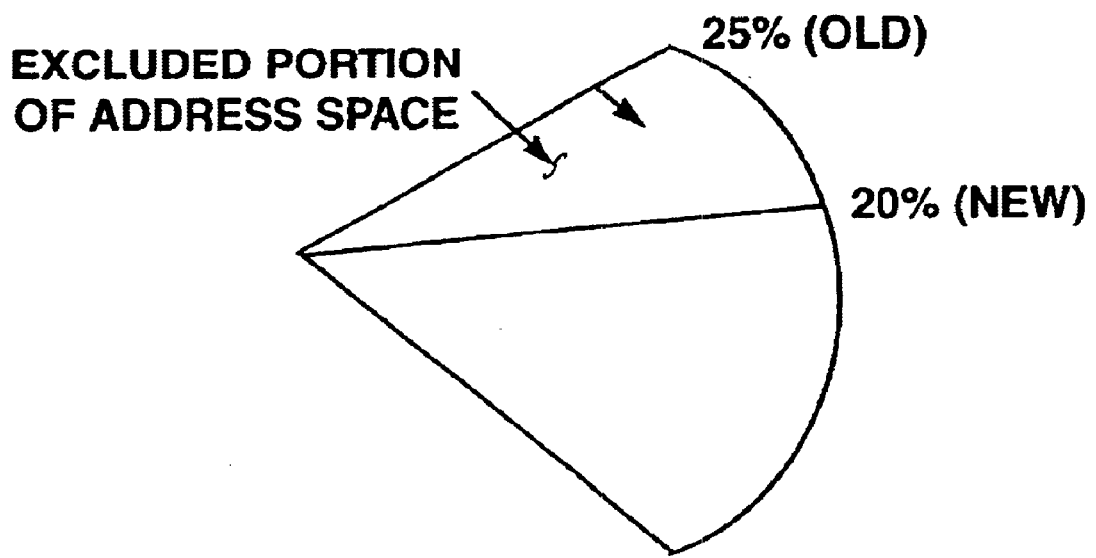
FIG. 11 is a partial pie chart showing a change in the address space assigned to a server.

FIG. 11 is a partial pie chart showing a change in the address space assigned to a server. Originally, 25% of the address space was assigned to the server being depicted. After reallocation (1020) this server's allocation was reduced to 20%. As a result of a reallocation, approximately 5% of the address space which previously had been assigned to the server under the old allocation has now been excluded under the new allocation. One of the problems in reallocation is how to handle the connections currently being serviced by a server when a reallocation of address space occurs.

Figure 12:
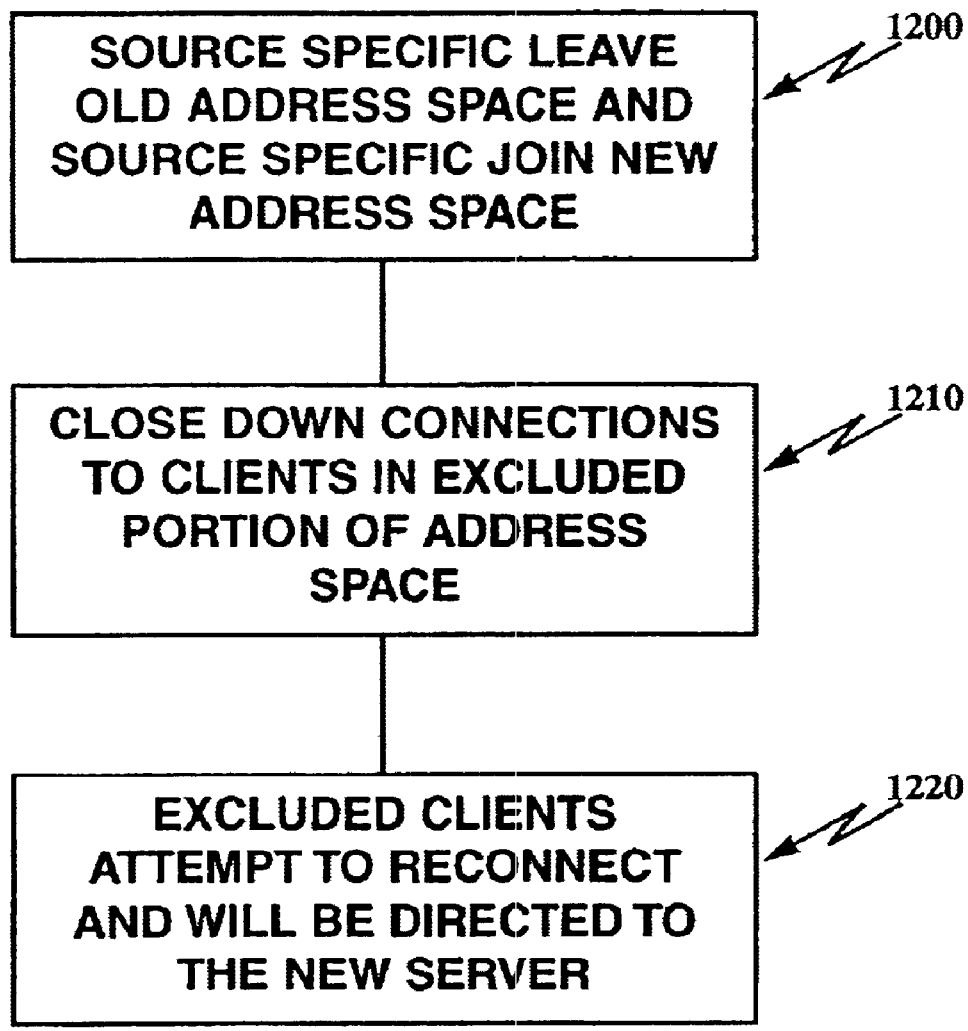
FIG. 12 is a flow chart of a first process for dealing with existing connections when a load reallocation occurs.

Four approaches to handling existing connections when reallocating load among the servers are discussed hereinafter. FIG. 12 is a flow chart of a first process for dealing with existing connections when a load reallocation occurs. A server whose allocation is changing from 25% to 20% as discussed in conjunction with FIG. 11, will do a source specific leave indicating it no longer wishes to receive packets from the old portion of the address space and, substantially simultaneously assert a source specific join indicating that it desires to receive packets from the new portions of address space allocated to it (1200). The connections from the excluded portion of the address space 1100 are simply closed down (1210). The users whose connections have been closed down will, in most cases, automatically attempt to reconnect. When this occurs, the reconnect is will be directed to the server servicing the portion of the address space to which that user's address belongs. Thus, connections are redirected from the old server to the new server with all but a small disruption.

Figure 13:
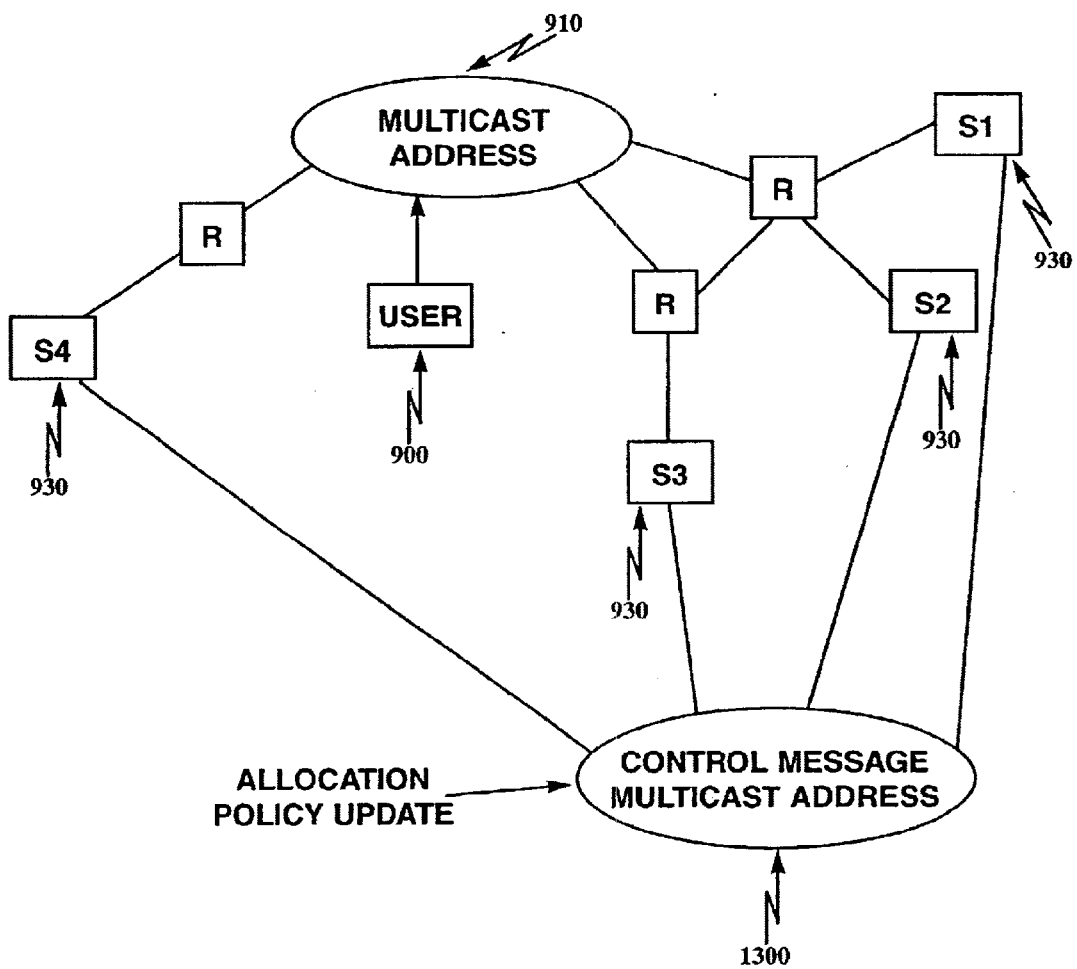
FIG. 13 is a block diagram of an exemplary second 10 embodiment for load sharing among servers in accordance with another aspect of the invention.

FIG. 13 is a block diagram of an exemplary second embodiment for load sharing among servers in accordance with another aspect of the invention.

The network illustrated corresponds to FIG. 9, however, it is expanded to show that the servers each join a control message multicast group (1300). As a result, each server can send control messages to and receive control messages from each other. This control message multicast channel is also a convenient way of distributing allocation policy update information before executing a change in address space for the various servers.

Figure 14:
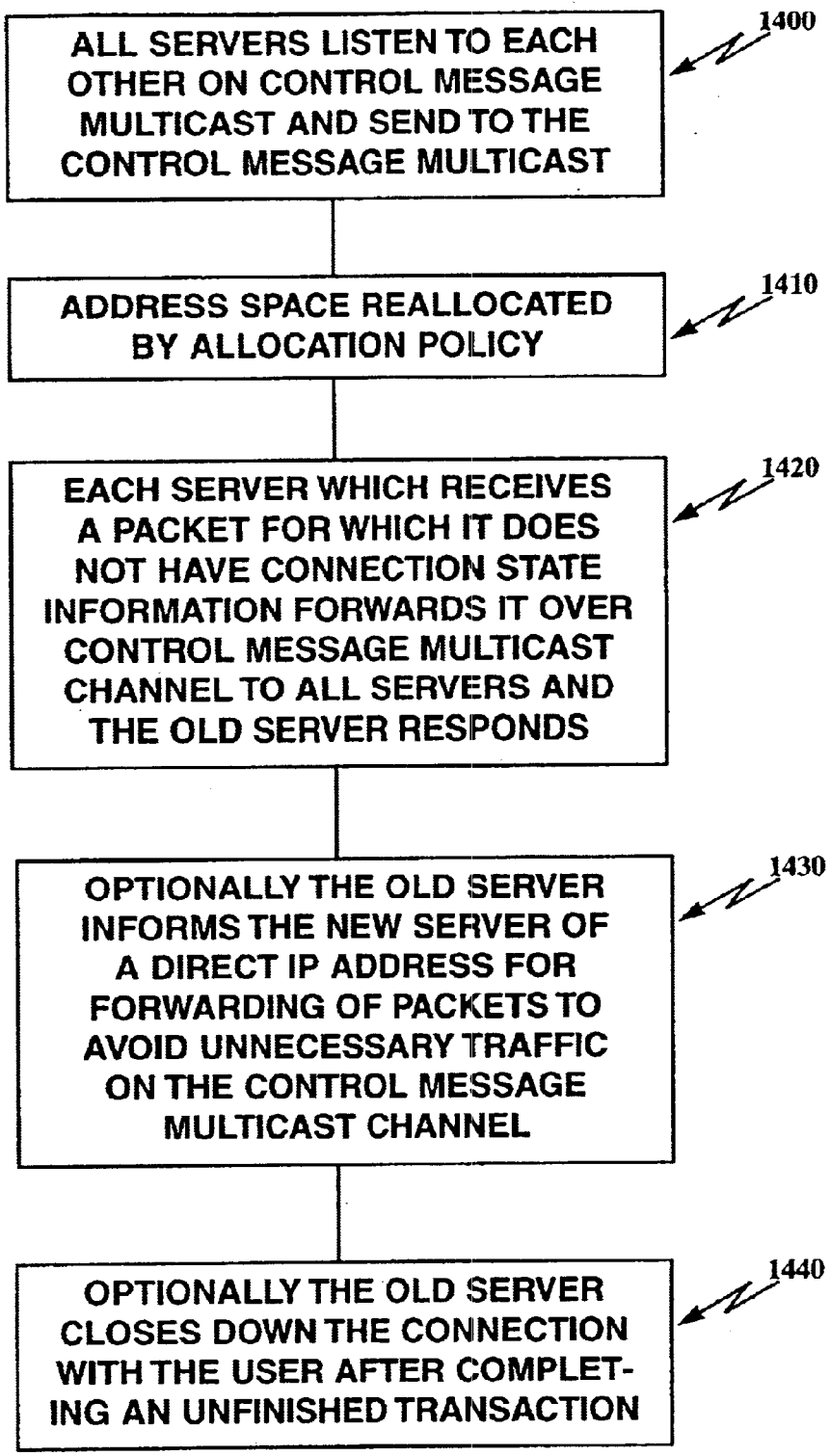
FIG. 14 is a flow chart of a second process for dealing with existing connections when load reallocation occurs.

FIG. 14 is a flow chart of a second process for dealing with existing connections when load reallocation occurs. As indicated in the discussion of FIG. 13, all servers listen to each other on a control message multicast channel and send control messages to each other (1400). When address space is reallocated (1410), some servers will begin receiving packets for existing connections from address space newly assigned to it for which it does not have connection state information (1420). When this occurs, the packet will be forwarded over the control message multicast channel to all servers and the old server, which previously handled the connection, will complete handling the connection until a convenient breakdown point occurs. This arrangement has the potential to create peaks of control message multicast traffic that may be undesirable. Rather than routing all such packets over the control message multicast channel, the old server, upon receiving a packet from the new server, may inform the new server of a direct IP address for the forwarding of packets (1430). This would avoid unnecessary traffic on the control message multicast channel. Further, the old server may optionally close down the connection with the user after completing an unfinished transaction (1440). The user would then attempt to reconnect and then be routed to a new server. This approach is one example of combining techniques when reallocating connections.

Figure 15:
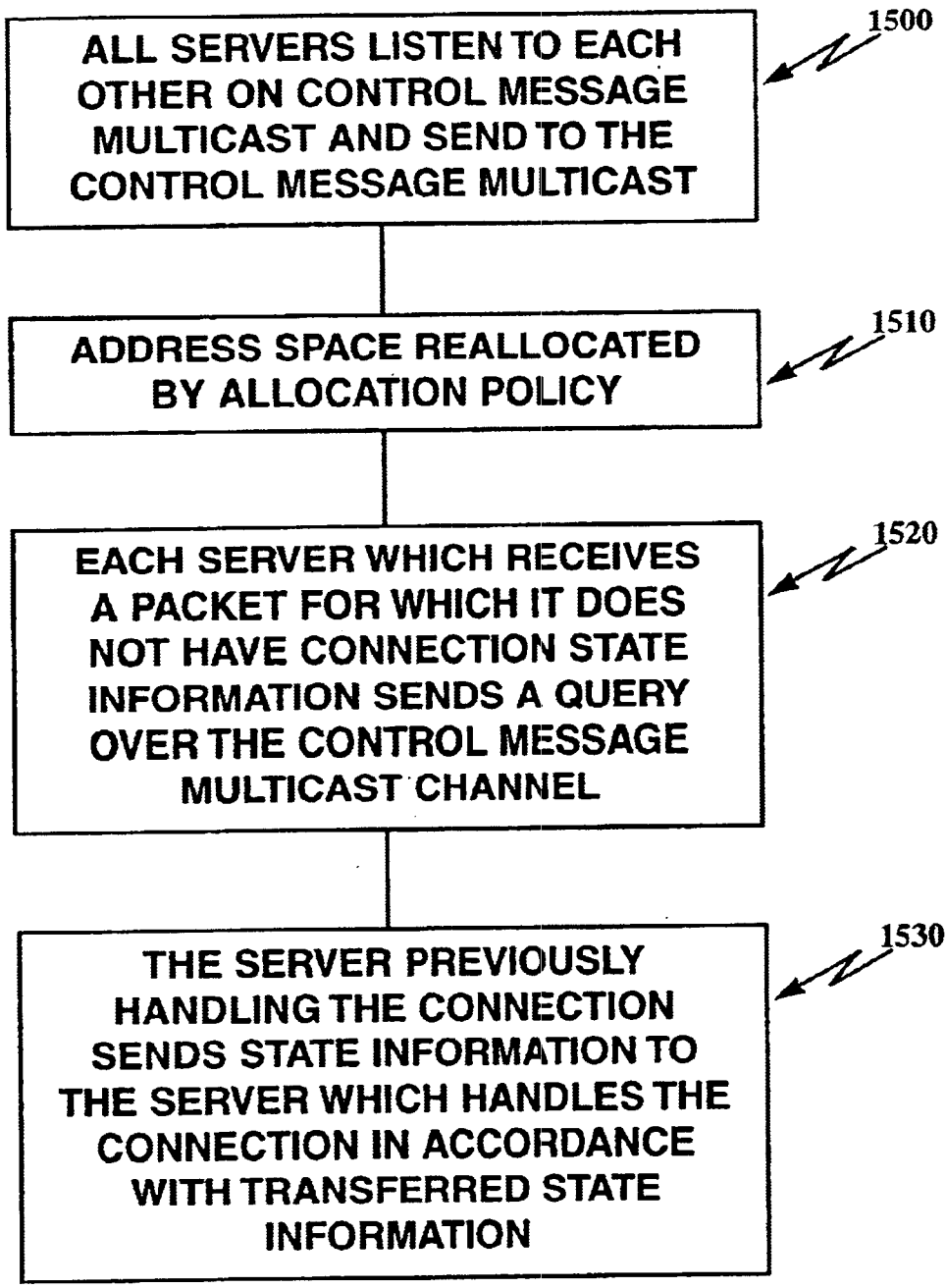
FIG. 15 is a flow chart of a third process for dealing with existing connections when load reallocation occurs.

FIG. 15 is a flow chart of a third process for dealing with existing connections when load reallocation occurs. As before, each of the servers is involved with a control message multicast group (1500) and when address space is reallocated (1510), a server, as discussed above, may receive a packet for which it does not have connection state information. When this occurs, it sends a query over the control message multicast channel (1520) and the server previously handling the connections sends state information to the new server which handles the connection in accordance with the transferred state information (1530).

Rather than depend on routing protocols to communicate across the switched core, tag switching lets the routers located on the edge of the intranet provide tags that the switches can use to forward packets. This minimizes the processing needed once the packet enters the tag-switched network. A tag-switching network would consist of tag switches and tag-edge routers, generally with tag switches forming the core of an intranet and tag-edge routers placed at the periphery to connect LANs and hosts to the Internet.

In a tag-switching network, tags are assigned based on the destination network, domain, or host. Based on Layer 3 routing protocols such as OSPF (Open Shortest Path First) and BGP (Border Gateway Protocol), a router applies a tag to each packet of the traffic flow. For an ATM-switched network, the tag would become part of the link layer header in thee VCI (Virtual Circuit Identifier) field of the ATM cell header. Packets are then switched through the network with each switch simply swapping the incoming tag for an appropriate forwarding tag rather than processing each packet's contents to determine the path.

In general, a tag switch will try to populate its Tag Information Base (TIB) with incoming and outgoing tags for all the routes it can access, so that all packets can be forwarded by simple label swapping. Tag table info is exchanged using a (lightweight) Tag Distribution Protocol (TDP). Tag allocation is thus driven by topology (as defined by routing), not by traffic.

Figure 16:
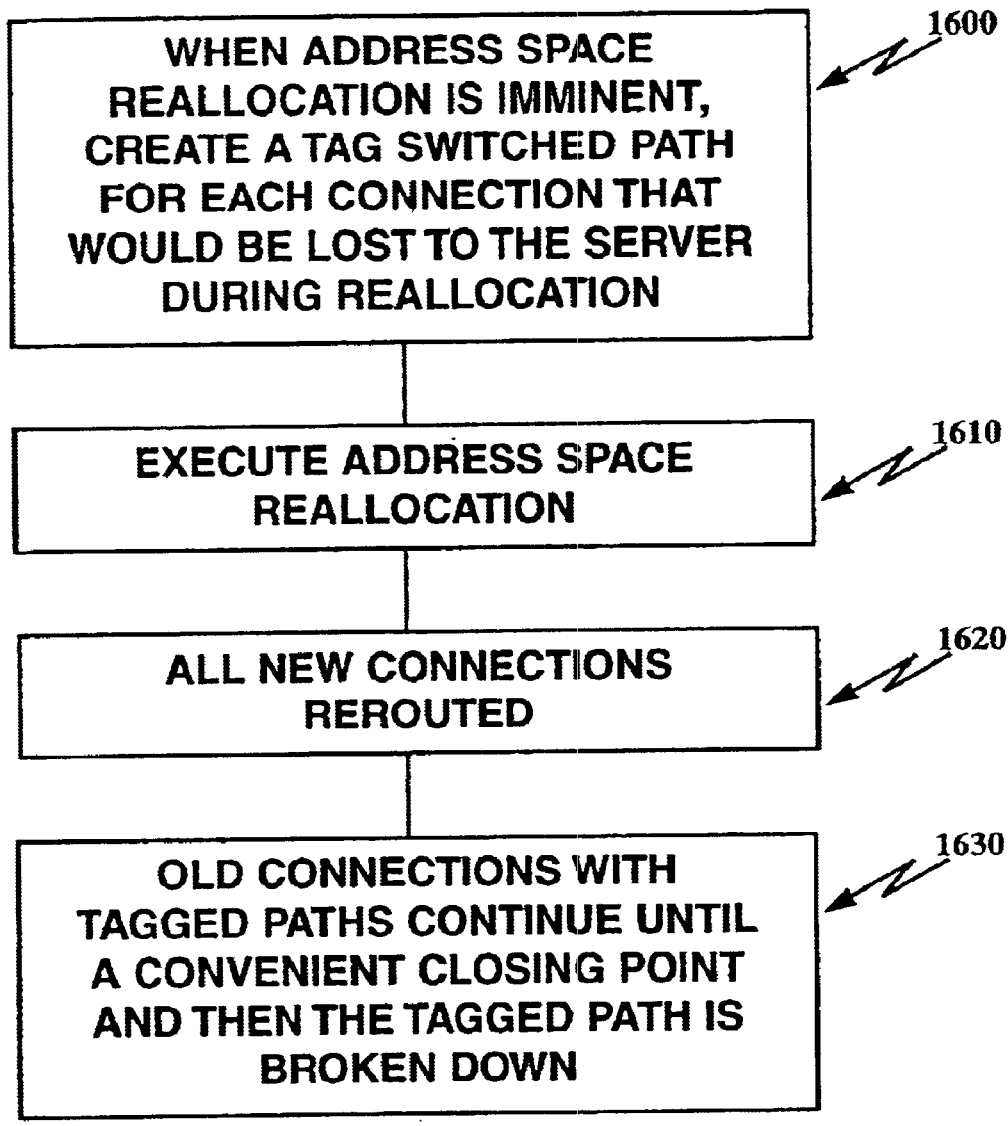
FIG. 16 is a flow chart of a fourth process for dealing with existing connections when load reallocation occurs.

FIG. 16 is a flow chart of a fourth process for dealing with existing connections when load reallocation occurs. Before address space reallocation, each server will create a tag switched path for each connection that would be lost to the server during reallocation (1600). When the address space reallocation is executed (1610) all newly established connections will be routed to the proper server based on the reallocation (1620). However, old connections with a tagged path continue until a convenient closing point and then the tagged path will be broken down (1630).

Figure 17:
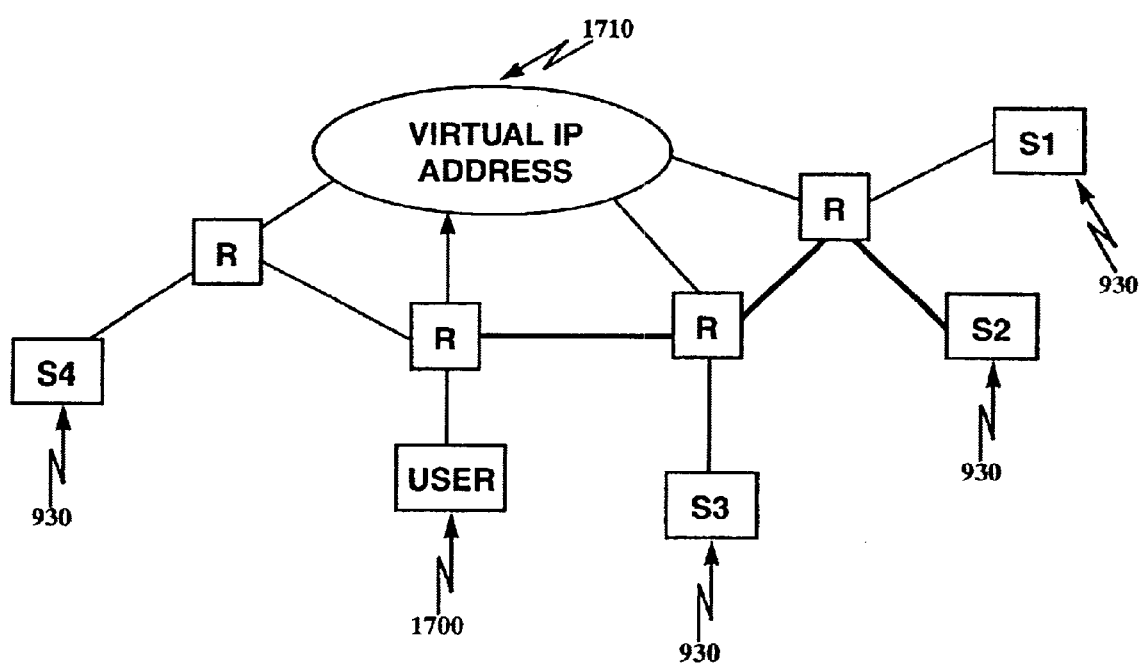
FIG. 17 is a block diagram of a tag switching approach to load sharing among servers.

FIG. 17 is a block diagram of a tag switching approach to load sharing among servers. FIG. 17 is similar to FIG. 9 except that the user 1700 attempts to connect to a well publicized virtual IP address (1710) which is handled by one or more real machines.

Figure 18:
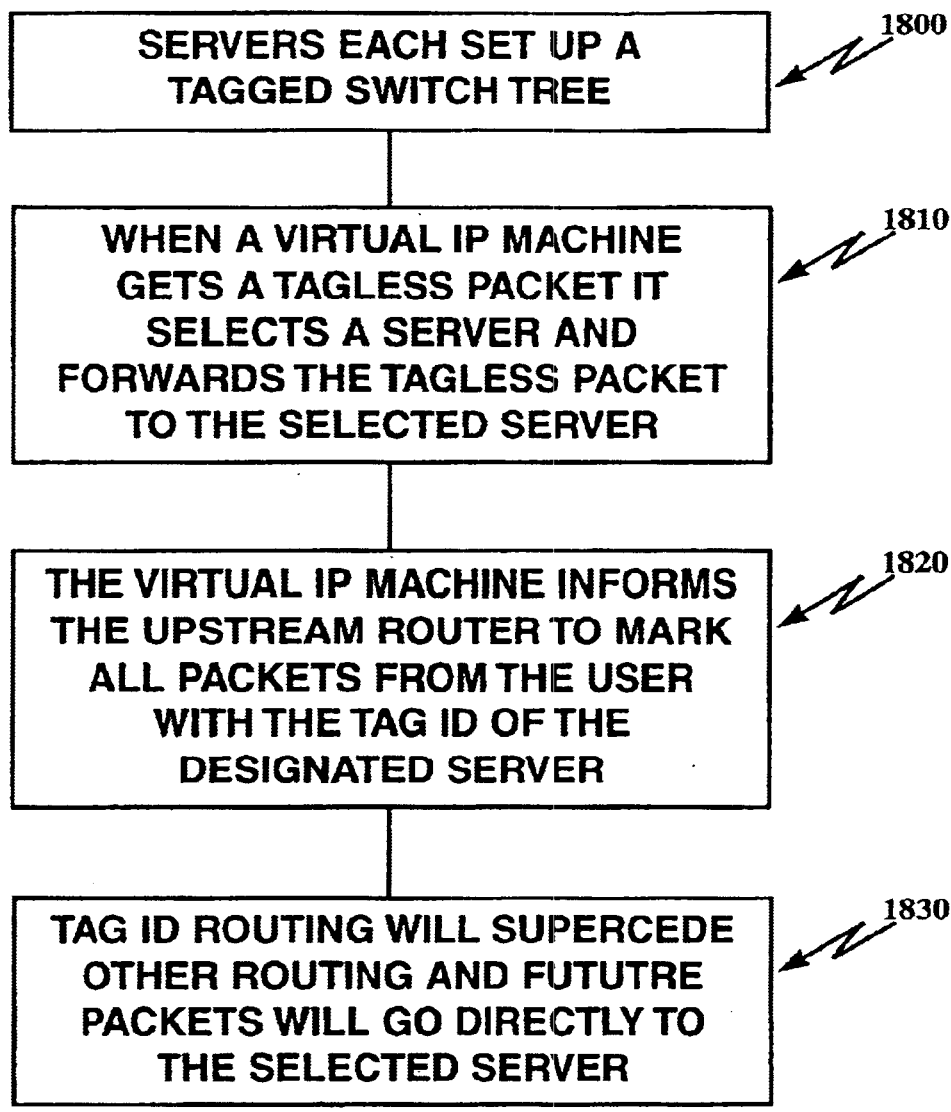
FIG. 18 is a process for load sharing in accordance with the invention using the arrangement of FIG. 17.

FIG. 18 is a process for load sharing in accordance with the invention using the arrangement of FIG. 17. Each of the servers shown in FIG. 17 sets up a tagged switched tree for routing in the network (1800). When a virtual IP router gets a tagless packet, it selects a server and forwards the tagless packet to the selected server (1810). The virtual IP router then informs the upstream router 1710 (and this router can in turn inform some or all of its upstream routers) to mark all packets from the user with the tag ID of the designated server (1820). The tag ID routing will supersede other routing and all future packets from the user will go directly to the selected server (1830).

Figure 19:
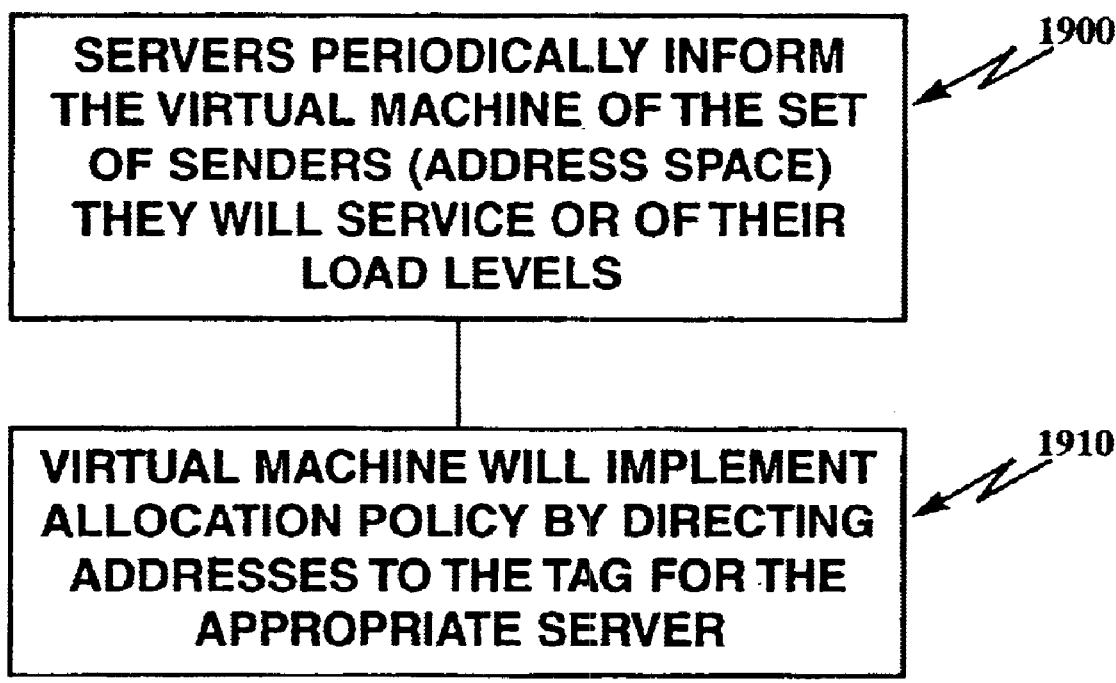
FIG. 19 is a flow chart of a process f or changing policy in the arrangement of FIG. 17.

FIG. 19 is a flow chart of a process for changing policy in the arrangement of FIG. 17. Servers periodically inform the virtual IP routers of the senders (or address space) they will service. Alternatively, they will inform the servers of their activity or load levels (1900). The virtual IP router will implement the allocation policy by directing addresses to the tag for the appropriate server (1910). Thus, the virtual IP router will control the tag applied to a service request and therefore control the traffic directed to individual servers.

Figure 20:
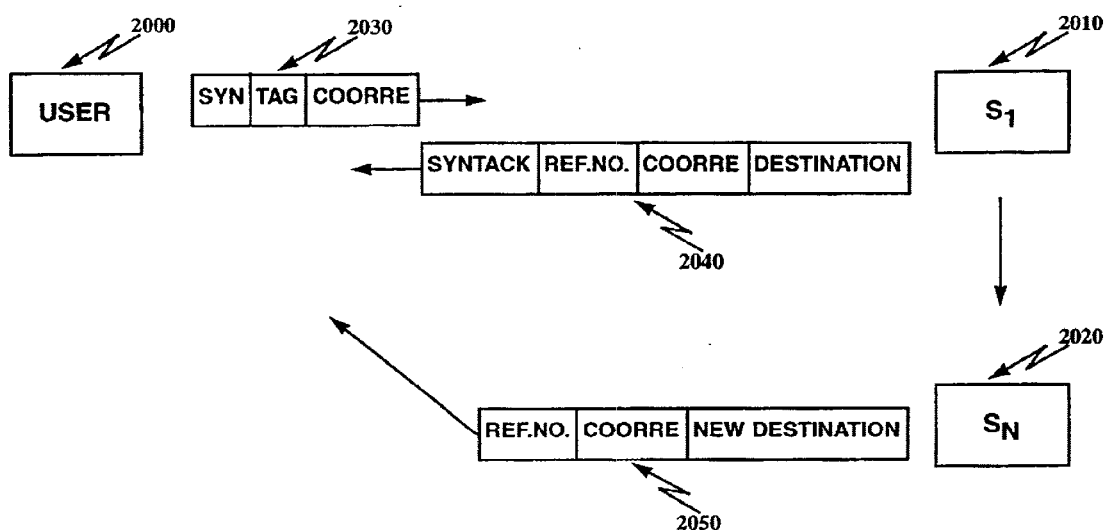
FIG. 20 is a block diagram of a dynamic TCP destination approach to load sharing among servers. In this approach, extensions to the TCP protocol are required.

FIG. 20 is a block diagram of a dynamic TCP destination approach to load sharing among servers. In this approach, extensions to the TCP protocol are required. A user 2000 will forward a synchronization (SYN) packet, the specification of which is extended to provide for the possibility of sending a tag and a cookie to a server, such as S1 (2010). The server to which the user is originally assigned responds with a SYN-ACK packet, the specification of which has also been extended to permit a tag, cookie, and destination information (2040) to be added; the SYN-ACK packet contains the same tag and cookie value that the client sent in the SYN packet. The server thus responds to the tag and the cookie from the client by sending back the same tag and cookie in the extended SYN-ACK packet as was received in the extended SYN packet. The client uses the tag-cookie values to match the SYN-ACK to the connection. If the loading on server S1 becomes excessive, server S1 may transfer a connection to server SN (2020) and the server SN will send to the user 2000 a packet 2050 containing the tag for the connection, the cookie and new destination information.

Figure 21:
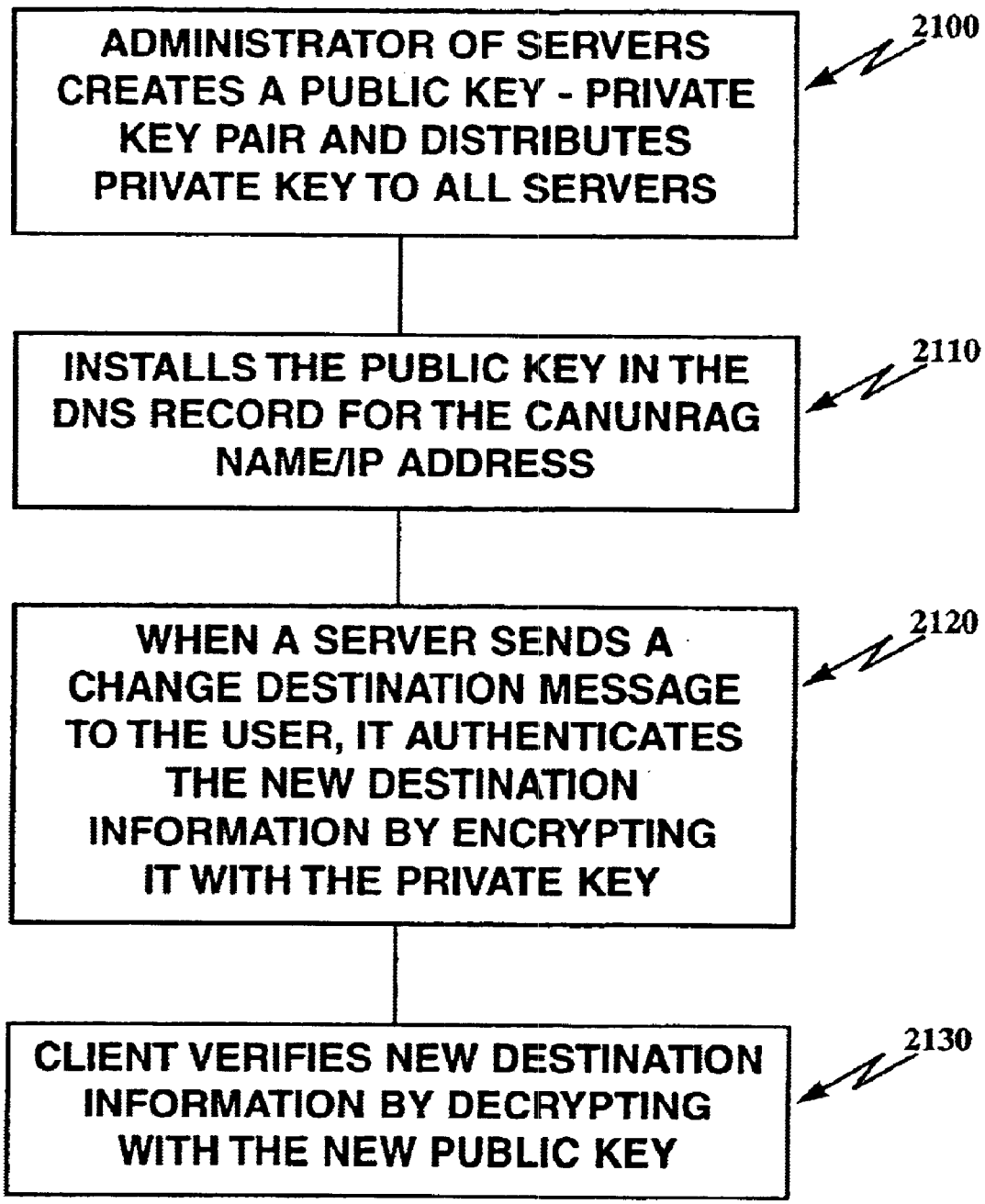
FIG. 21 is a flow chart of a process for switching servers in a dynamic TCP environment of FIG. 20 in a way that prevents hijacking of a connection.

FIG. 21 is a flow chart of a process for switching servers in a dynamic TCP environment in a way that prevents hijacking of a connection. An administrator or other responsible person of the sponsoring organization which runs the servers responding to connection requests to a well published address creates a public key-private key pair and distributes the private key to all servers (2100). The public key of the public-private key pair is installed in the DNS record for the canonical name/IP address entry in the DNS server (2110). Alternatively, rather than installing the public key in the DNS record, it can be obtained from an authentication server, trusted third party or the like. When a server sends the change destination message to the user, it authenticates the new destination information by encrypting it with the private key (2120). The client then verifies the new destination information by decrypting it with the public key installed on the DNS server (2130). In this manner, the client can verify that the change of information originated from an authentic source.

Figure 22A:
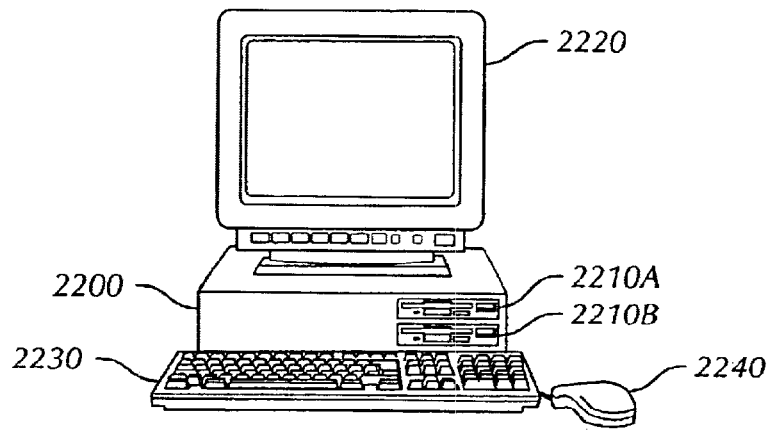
FIG. 22A illustrates a computer of a type suitable for carrying out the invention.

FIG. 22A shows a computer architecture which is suited for either a user workstation, for a controller for a switching node, for a routing element or for use as a server. However, when configured as a routing element, I/O devices will normally only be attached during servicing. When configured as a router, a plurality of communications interfaces or ports 2285 will normally be provided, one for each port. When configured as a. controller for a switch at a switching node, a hardware interface will be provided to link the bus 2250 with a switching matrix. When configured as either a router or a controller, the computer may be installed as a board in an equipment rack rather than being a standalone unit as shown. When configured as a user workstation or as a server, the computer may commonly be as shown, although other packaging is possible. Viewed externally in FIG. 22A, a computer system has a central processing unit 2200 having disk drives 2210A and 2210B. Disk drive indications 2210A and 2210B are merely symbolic of a number of disk drives which might be accommodated by the computer system. Typically, these would include a floppy disk drive such as 2210A, a hard disk drive (not shown externally) and a CD ROM drive indicated by slot 2210B. The number and type of drives varies, typically, with different computer configurations. The computer has the display 2220 upon which information is displayed. A keyboard 2230 and a mouse 2240 are typically also available as input devices. Preferably, the computer illustrated in FIG. 22A is a SPARC™ workstation from Sun Microsystems, Inc.

Figure 22B:
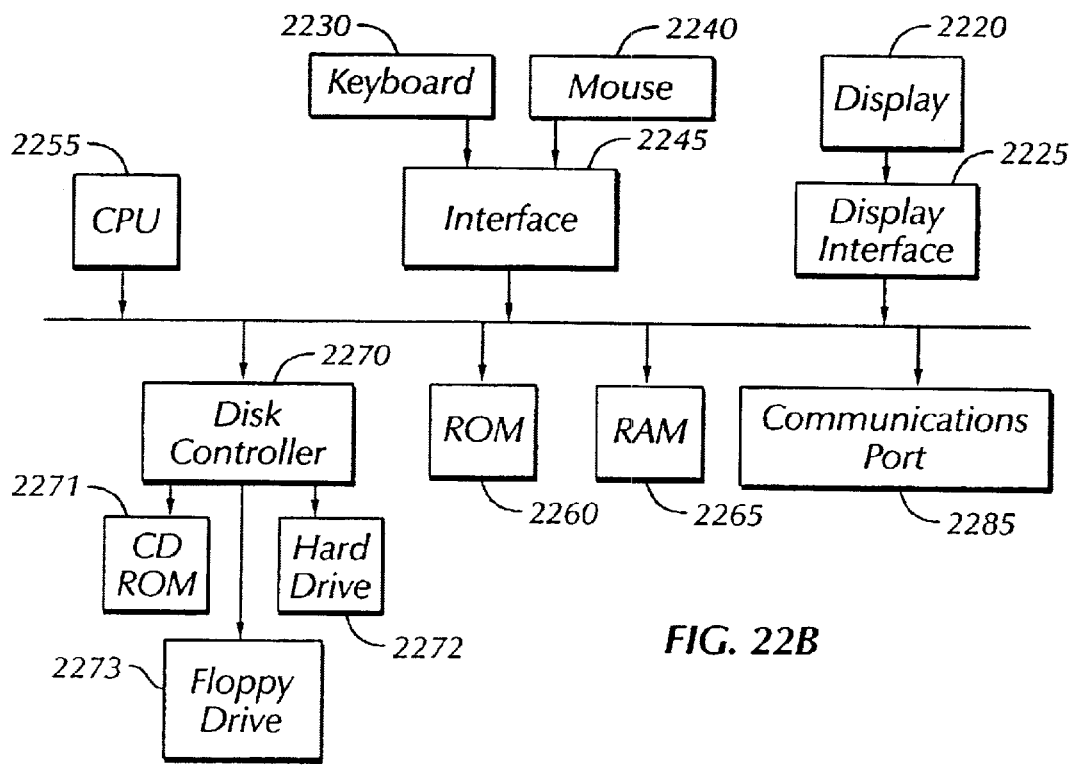
FIG. 22B illustrates a block diagram of the internal hardware of the computer of FIG. 22A.

FIG. 22B illustrates a block diagram of the internal hardware of the computer of FIG. 22A. A bus 2250 serves as the main information highway interconnecting the other components of the computer. CPU 2255 is the central processing unit of the system, performing calculations and logic operations required to execute programs. Read only memory (2260) and random access memory (2265) constitute the main memory of the computer. Disk controller 2270 interfaces one or more disk drives to the system bus 2250. These disk drives may be floppy disk drives, such as 2273, internal or external hard drives, such as 2272, or CD ROM or DVD (Digital Video Disks) drives such as 2271. A display interface 2275 interfaces a display 2220 and permits information from the bus to be viewed on the display. Communications with external devices can occur over communications port 2285.

CPU 2200 includes a communications interface 2285 coupled to bus 2250. Communications interface 2285 provides a two-way data communications coupling to a network link to a local network such as 100D of FIG. 1. For example, if communications interface 2285 is an integrated services digital network (ISDN) card or a modem, communications interface 2285 provides a data communications connection to the corresponding type of telephone line. If communications interface 2285 is a local area network (LAN) card, communications interface 2285 provides. a data communications connection to a compatible LAN. Wireless links are also possible. In any such implementation, communications interface 2285 sends and receives electrical, electromagnetic or optical signals which carry digital data streams representing various types of information.

The network link typically provides data communications through one or more networks such as 100A–110D of FIG. 1, to other data devices. For example, the network link may provide a connection through local network to a host computer or to data equipment operated by an Internet Service Provider (ISP). An ISP may in turn provide data communications services through the world wide packet data communications network now commonly referred to as the "Internet". The local network and Internet both use electrical, electromagnetic or optical signals which carry digital data streams. The signals through the various networks and the signals on the network link and through communications interface 2285, which carry the digital data to and from CPU 2200 are exemplary forms of carrier waves transporting the information.

CPU 2200 can send messages and receive data, including program code, through the network(s), network link and communications interface 2285. In the Internet example, a server might transmit requested code for an application program through Internet, ISP, local network and communications port 2285. In accordance with the invention, one such download application may include software implementing the techniques described herein.

The received code may be executed by processor 2255 as it is received, and/or stored in storage devices 2260, 2265 and/or 2271–2273, or other non-volatile storage for later execution. In this manner CPU 2200 may obtain application code in the form of a carrier wave.

Figure 22C:
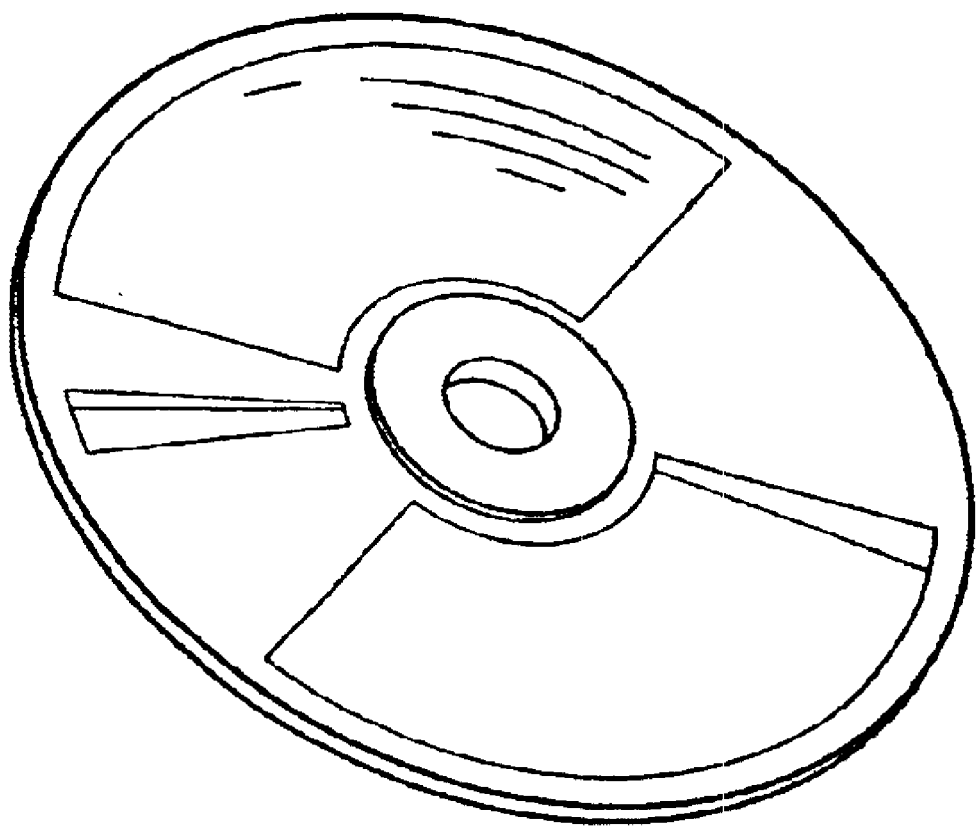
FIG. 22C illustrates an exemplary memory medium which can be used with drives such as 2271 in FIG. 22B or 2210A in FIG. 22A.

FIG. 22C illustrates an exemplary memory medium which can be used with drives such as 2271 in FIG. 22B or 2210A in FIG. 22A. Typically, memory media such as a floppy disk, or a CD ROM, or a Digital Video Disk will contain the program information for controlling the computer to enable the computer to perform its functions in accordance with the invention.

The multicasting approach to server allocation, discussed above, provides a simple general purpose interface that works across a spectrum of varying user needs. It does not unreasonably increase the overhead for setting up and operating the multicast for users who would like to continue to set up simple open meetings. The systems provides security even if outsiders know the IP address and/or port number which might otherwise enable them to misbehave or behave maliciously. The system is flexible in that it does not require the multicast sessions organizers to know the identity of all the senders and/or listeners in advance. It also permits servers or users to dynamically join the discussions when desired.

Even if the system is compromised, it is possible to reasonably limit the damage caused by excluding that user or group of users from the multicast session. The approach described here is also compatible with current and proposed mechanism and protocols for multicasting.

The techniques described provide a variety of tools which can be used singly or in combination to allocate connections to servers to provide for load balancing.

Although the present invention has been described and illustrated in detail, it is clearly understood that the same is by way of illustration and example only and is not to be taken by way of limitation, the spirit and scope of the present invention being limited only by the terms of the appended claims and their equivalents.

What is claimed is:

1. A method for load balancing comprising:
   creating a network to service a single multicast address comprising a plurality of servers using a source specific join, wherein said source specific join allows each of said plurality of servers to specify a source internet protocol address range that each of said plurality of servers services; and
   reallocating said source internet protocol address range specified for at least one of said plurality of servers using a load balancing policy and a control multicast channel while said at least one of said plurality of servers is handling communications.

2. The method of claim 1, wherein said source internet protocol address range is reallocated for at least one of said plurality of servers using at least one selected from said group consisting of a source specific leave and said source specific join.

3. The method of claim 1 wherein said load balancing policy comprises:
   sending a SYN packet for a TCP connection from a user to a first one of said plurality of servers including a tag and a cookie; and
   sending a SYN-ACK packet from said first one of said plurality of servers to said user including a tag, cookie and destination information.

4. The method of claim 3, wherein said load balancing policy further comprises re-directing a connection from said first one of said plurality of servers to a second one of said plurality of servers by sending a packet from said second one of said plurality of servers to said user containing said tag, said cookie and new destination information.

5. A method of allocating communications to a plurality of servers, comprising:
   directing all communications to be handled by said plurality of servers to a multicast address, and causing said plurality of servers to listen to packets originating a different source internet protocol address range, wherein said different source internet protocol address range assigned to one of said plurality of servers may be reallocated to carry out a load balancing policy using a multicast control.

6. The method of claim 5 wherein, when a packet is received at one of said plurality of servers over a user connection originating from a source internet protocol address in said source internet protocol address range previously serviced by a different member of said plurality of servers but now serviced by said one of said plurality of servers, said one of said plurality of servers causes disconnection of said user connection.

7. The method of claim 5 wherein, when a packet is received at one of said plurality of servers from a user having a source internet protocol address in said source internet protocol address range not previously serviced by said one of said plurality of servers but which is currently serviced by said one of said plurality of servers, said one of said plurality of servers forwards that packet over said control multicast channel to said plurality of servers.

8. The method of claim 7 wherein, said one of said plurality of servers previously handling said user processes said packet received over said control multicast channel.

9. The method of claim 7 wherein, said one of said plurality of servers previously handling said user notifies said one of said plurality of servers currently servicing said user to forward future packets over a point to point connection.

10. The method of claim 5 wherein, when a packet is received at one of said plurality of servers from a user having a source internet protocol address in said source internet protocol address range not previously serviced by said one of said plurality of servers but which is currently serviced by said one of said plurality of servers and for which said one of said plurality of servers does not have current state information, said one of said plurality of servers requests state information over said control multicast channel.

11. The method of claim 10 wherein, said one of said plurality of servers processes said packet in accordance with state information received over said control multicast channel.

12. A computer network, comprising:
   at least one user device connected to said network and sending information to a multicast address; and
   a plurality of servers connected to said network and configured to receive multicast packets only from users having source addresses from at least one source internet protocol address range using a load balancing policy and a control multicast channel,
   wherein said source internet protocol address range specified for at least one of said plurality of serves is reallocated using the control multicast channel while said at least one of said plurality of servers is handling communications.

13. The network of claim 12 wherein, said source internet address protocol address range assigned to a particular server changes in accordance with a load balancing policy.

14. The network of claim 13 wherein, existing connections are handled when a connection from one source internet address protocol range is transferred to from a first member of said plurality of servers to a second member of said plurality of servers.

* * * * *